(12) United States Patent
Tofuku

(10) Patent No.: US 8,470,212 B2
(45) Date of Patent: Jun. 25, 2013

(54) INFRARED SHIELDING NANOPARTICLE, ITS MANUFACTURING METHOD, INFRARED SHIELDING NANOPARTICLE DISPERSION USING THE SAME, AND INFRARED SHIELDING BASE MATERIAL

(75) Inventor: Atsushi Tofuku, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 13/127,192

(22) PCT Filed: Nov. 13, 2008

(86) PCT No.: PCT/JP2008/070692
§ 371 (c)(1),
(2), (4) Date: Jul. 20, 2011

(87) PCT Pub. No.: WO2010/055570
PCT Pub. Date: May 20, 2010

(65) Prior Publication Data
US 2011/0297899 A1  Dec. 8, 2011

(51) Int. Cl.
| F21V 9/04 | (2006.01) |
| F21V 9/06 | (2006.01) |
| G02B 5/22 | (2006.01) |
| G02B 5/26 | (2006.01) |
| C04B 35/00 | (2006.01) |
| B29D 11/00 | (2006.01) |

(52) U.S. Cl.
USPC ............ 252/587; 252/301.36; 252/301.5; 252/500; 264/1.1; 264/171.25; 423/594.13; 423/606; 428/690; 501/1

(58) Field of Classification Search
USPC ........... 252/587, 301.36, 301.5, 500; 264/1.1, 264/171.25; 399/159; 423/263, 325, 592.1, 423/594.19, 594.9, 604, 605, 607, 608, 609, 423/610, 618, 622, 625, 632, 635, 594.13, 423/606; 430/58.05, 58.1, 58.2; 501/1; 524/432; 977/773, 811; 428/690, 357, 402, 405
See application file for complete search history.

(56) References Cited

U.S. PATENT DOCUMENTS

| 2006/0171870 A1* | 8/2006 | Qi et al. .................. 423/265 |
| 2006/0178254 A1* | 8/2006 | Takeda et al. ............. 501/1 |
| 2007/0259176 A1* | 11/2007 | Deng et al. ............... 428/357 |
| 2009/0169892 A1* | 7/2009 | Bazzi et al. .............. 428/404 |

FOREIGN PATENT DOCUMENTS

| JP | A-08-012378 | 1/1996 |
| JP | A-08-059300 | 3/1996 |
| JP | A-08-073223 | 3/1996 |
| JP | A-08-283044 | 10/1996 |

(Continued)

OTHER PUBLICATIONS

International Search Report issued in corresponding International Patent Application No. PCT/JP2008/070692 dated Feb. 17, 2009 (with translation).

Primary Examiner — Bijan Ahvazi
(74) Attorney, Agent, or Firm — Oliff & Berridge, PLC

(57) ABSTRACT

There is provided infrared shielding nanoparticles having excellent water-resistant property and excellent infrared shielding property, which is the infrared shielding nanoparticles of composite tungsten oxide expressed by a general formula $W_yO_z$ and/or a general formula $M_xW_yO_z$, with an average primary particle size of the nanoparticle being 1 nm or more and 800 nm or less, and a surface of the nanoparticle being coated with tetrafunctional silane compound or its hydrolysis product and/or an organic metal compound.

20 Claims, 1 Drawing Sheet

Wherein
● Tungsten
○ Oxygen
◉ Element M 1 unit

FOREIGN PATENT DOCUMENTS

| | | |
|---|---|---|
| JP | A-09-127559 | 5/1997 |
| JP | A-2000-119045 | 4/2000 |
| JP | A-2003-121884 | 4/2003 |
| JP | A-2005-226008 | 8/2005 |
| JP | 2006-068964 * | 3/2006 |
| JP | A-2006-068964 | 3/2006 |
| JP | A-2006-219662 | 8/2006 |
| JP | A-2006-282736 | 10/2006 |
| JP | A-2006-299087 | 11/2006 |
| JP | A-2007-311208 | 11/2007 |
| JP | A-2007-314752 | 12/2007 |
| JP | A-2008-024902 | 2/2008 |
| JP | A-2008-194563 | 8/2008 |
| JP | A-2008-291109 | 12/2008 |
| WO | WO 2005/037932 A1 | 4/2005 |

* cited by examiner

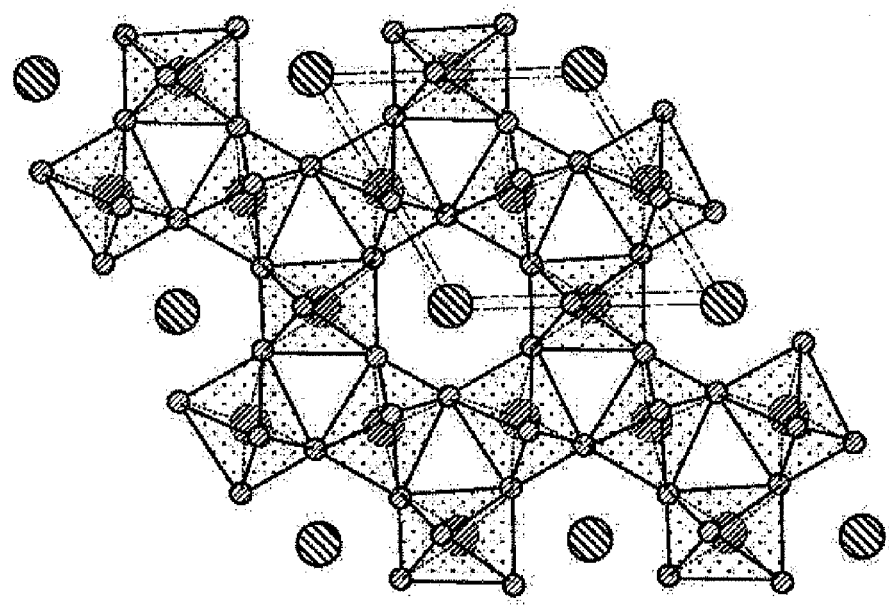
Wherein
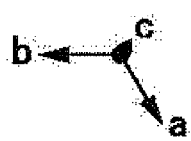
1 unit
- Tungsten
- Oxygen
- Element M

INFRARED SHIELDING NANOPARTICLE, ITS MANUFACTURING METHOD, INFRARED SHIELDING NANOPARTICLE DISPERSION USING THE SAME, AND INFRARED SHIELDING BASE MATERIAL

TECHNICAL FIELD

The present invention relates to an infrared shielding nanoparticle with a surface of the nanoparticle coated with a prescribed coating film, being a tungsten oxide nanoparticle or a composite tungsten oxide nanoparticle that transmits a light in a visible light region and absorbs a light in a near infrared region, its manufacturing method, and an infrared shielding nanoparticles dispersion containing the infrared shielding nanoparticle, and an infrared shielding base material.

DESCRIPTION OF RELATED ART

In recent years, a demand for an infrared shielding body has been suddenly increased, and a lot of patents are disclosed regarding the infrared shielding body. From a functional viewpoint, for example, a field such as a window material, etc., of each kind of constructions or a vehicle, there are the infrared shielding body for shielding a light in a near infrared region while sufficiently capturing a visible light beam and suppressing a temperature rise in a room while maintaining brightness, and preventing a near infrared beam emitted frontward from PDP (Plasma Display Panel), from causing a malfunction in a cordless phone or a remote controller of a household electric appliance, or from giving an adverse influence on a transmission system optical communication.

Further, from a viewpoint of a light shielding member, for example, there is provided a light shielding film containing a black pigment including an inorganic pigment such as carbon black or titanium black having an absorption property in a region from a visible light region to a near infrared region, and an organic pigment such as aniline black having a strong absorption property only in the visible light region, and a light shielding member of a half mirror type with a metal such as aluminum deposited thereon.

Patent document 1 discloses an infrared shielding glass, comprising a composite tungsten oxide film formed on a transparent glass substrate as a first layer from a substrate side containing at least one kind of metal ion selected from a group consisting of group IIIA, IVa, Vb, VIb, and VIIb in a periodic table; a transparent dielectric film formed on the first layer as a second layer; and a composite tungsten oxide film formed on the second layer as a third layer containing at least one kind of metal ion selected from a group consisting of group IIIa, IVa, Vb, VIb, and VIIb of the periodic table, and which can be suitably used at a part where high visible light transmittance and an excellent infrared shielding property are required, by making a refractive index of the transparent dielectric film of the second layer lower than a refractive index of the composite tungsten oxide film of the third layer.

Patent document 2 discloses an infrared shielding glass, comprising: a first dielectric film formed on a transparent glass substrate as a first layer from a substrate side; a tungsten oxide film formed on the first layer as a second layer; and a second dielectric film formed on the second layer as a third layer.

Patent document 3 discloses a heat ray shielding glass, comprising a composite oxide tungsten film containing a similar metal element formed on a transparent substrate, as a first layer from a substrate side; and a transparent dielectric film formed on the first layer as a second layer.

Patent document 4 discloses a solar light control glass sheet having a solar light shielding property, which is formed by coating it with a metal oxide film selected from one kind or more of tungsten trioxide ($WO_3$), molybdenum trioxide ($MoO_3$), niobium pentaoxide ($Nb_2O_5$), tantalum pentaoxide ($Ta_2O_5$), vanadium pentaoxide ($V_2O_5$), and vanadium dioxide ($VO_2$), containing additive elements such as hydrogen, lithium, sodium, or potassium, by CVD method or spraying, and is formed by thermal decomposition at a temperature of about 250° C.

Patent document 5 discloses a solar light variable controllable thermally insulating material wherein tungsten oxide obtained by hydrolyzing tungsten acid is used, and an organic polymer is added to the tungsten oxide, the organic polymer having a specific structure of polyvinylpyrrolidone, whereby when the tungsten oxide added with the organic polymer is irradiated with the solar light, ultraviolet rays in light beams are absorbed into the tungsten oxide to thereby generate excitation electrons and holes, thus remarkably increasing an appearance amount of pentavalent tungsten due to a small amount of ultraviolet rays and accelerating a coloring reaction and simultaneously generating high coloring concentration, and the pentavalent tungsten is extremely speedily oxidized to hexavalent tungsten by shielding lights to thereby accelerate a bleaching reaction. By using such a property, the solar light variable controllable thermally insulating material can be obtained, with fast coloring and bleaching reaction to the solar light, an absorption peak appearing in wavelength of 1250 nm in a near infrared region during coloring, and capable of shielding the near infrared ray of the solar light.

Further, patent document 6 discloses as follows: powder composed of tungsten trioxide or its hydrate or a mixture of them is obtained by dissolving tungsten hexachloride into alcohol, vaporizing the solvent or heating and refluxing the solution and then vaporizing the solvent, and thereafter heating the solution at 100 to 500° C.; an electrochromic element is obtained by using the tungsten oxide nanoparticles; and a multilayer lamination body is constructed and an optical property of the film can be varied when proton is introduced into the film.

Further, patent document 7 discloses a method of manufacturing various tungsten bronze expressed by $MxWO_3$(M; metal elements such as alkali, alkali earths, rare earths, satisfying $0<x<1$), by using meta-ammonium tungstate aqueous solution and each kind of water-soluble metal salt as raw materials, heating a dried matter of the mixed aqueous solution at a heating temperature of about 300 to 700° C., and supplying hydrogen gas which is obtained by adding inactive gas (addition amount; about 50 vol % or more) or water vapor (addition amount; about 15 vol % or less) during heating. Further disclosed is a method of manufacturing various tungsten bronze-coated complex by performing a similar operation on a support, so as to be used as an electrode catalytic material such as a fuel cell.

Further, patent document 8 discloses an optical property, electroconductivity, and a manufacturing method of an infrared shielding material nanoparticles dispersion, which is the infrared shielding material nanoparticles dispersion with infrared shielding material nanoparticles dispersed in a medium, wherein the infrared shielding material nanoparticles are nanoparticles of tungsten oxide expressed by a general formula $WyOz$ (wherein W is tungsten, O is oxygen, satisfying $2.2 \leq z/y \leq 2.999$), and/or nanoparticles of composite tungsten oxide expressed by a general formula $MxWyOz$ (wherein M is H, He, alkali metals, alkali earth metals, rare earth elements, and one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, W is tungsten, and O is oxygen, satisfying $0.001 \leq x/y \leq 1$, $2.2 \leq z/y \leq 3.0$), and a particle diameter of each infrared ray shielding material nanoparticle is 1 nm or more and 800 nm or less.

Patent document 1:
Japanese Patent Laid Open Publication No. 08-59300
Patent document 2:
Japanese Patent Laid Open Publication No. 08-12378
Patent document 3:
Japanese Patent Laid Open Publication No. 08-283044
Patent document 4:
Japanese Patent Laid Open Publication No. 2000-119045
Patent document 5:
Japanese Patent Laid Open Publication No. 09-127559
Patent document 6:
Japanese Patent Laid Open Publication No. 2003-121884
Patent document 7:
Japanese Patent Laid Open Publication No. 08-73223
Patent document 8:
International Publication WO 2005/37932

DISCLOSURE OF THE INVENTION

Problem to be Solved by the Invention

An infrared shielding material is basically used outdoors in terms of its characteristics, requiring high weather-resistance in many cases. However, after studying by inventors of the present invention, it is found that in some optical member (such as a film or a resin sheet) containing the tungsten oxide nanoparticles and/or the composite tungsten oxide nanoparticles, water vapor or water in the air is gradually penetrated into a matrix, depending on a using method, to thereby decompose a surface of the tungsten-containing oxide nanoparticles, resulting in time-series rise of a transmittance of a light with a wavelength of 200 to 2600 nm, and gradually reducing an infrared shielding performance.

Here, after studying by the inventors of the present invention, it is found that even in the tungsten oxide nanoparticles and the composite tungsten oxide nanoparticles disclosed in patent document 8, a surface of each nanoparticle is decomposed and degraded by active harmful radical generated in water vapor or water in the air or in a high molecular dispersion medium such as a resin (generated by an external energy such as ultraviolet rays, etc.). Particularly, it is also found that the loss ratio of an infrared shielding effect due to decomposition and degradation is great, as a surface activity of the nanoparticles is higher.

In view of the above-described circumstance the present invention is provided, and an object of the present invention is to provide infrared shielding nanoparticles having excellent water-resistant property and excellent infrared shielding properties, a manufacturing of the same, an infrared shielding nanoparticles dispersion using the same, and an infrared shielding base material.

Means for solving the Problem

In order to solve the above-described problem, inventors of the present invention study regarding an improvement of a water-resistant property and a chemical stability of the tungsten oxide nanoparticles and the composite tungsten oxide nanoparticles having excellent optical properties. As a result, the inventors of the present invention found it important to firmly coat the surface of the individual particle by using a compound excellent in affinity with the surfaces of the tungsten oxide nanoparticles and the composite tungsten oxide nanoparticles, which penetrates into a gap between particles of agglomerated nanoparticles, and which is uniformly adsorbed on the surface of the individual particle, to thereby form a coating film.

After further study by the inventors of the present invention, it is found that as the compound which is uniformly adsorbed on the surface of the individual particle to thereby form the coating film, an organic metal compound and a tetrafunctional silane compound expressed by a general formula $Si(OR)_4$ (wherein R is identical or different kind of 1-6C univalent hydrocarbon group) (abbreviated as "tetrafunctional silane compound" in some cases in the present invention.) or its partial hydrolysis product is suitable. Namely, it is found that the water-resistant property and the chemical stability can be given to the nanoparticles by coating the surface of each tungsten oxide nanoparticle and/or each composite tungsten oxide nanoparticle with the organic metal compound, or coating it with the tetrafunctional silane compound or its partial hydrolysis product, or further preferably coating it with the organic metal compound and the tetrafunctional silane compound or its partial hydrolysis product. Then, it is also found that an infrared shielding base material, and an infrared shielding nanoparticles dispersion, etc., in which the tungsten oxide nanoparticles and the composite tungsten oxide nanoparticles having the water-resistant property and the chemical stability are used, have excellent water-resistant property and chemical stability, and also have excellent infrared shielding property. Thus, the present invention is achieved.

Namely, in order to solve the above-described problem, according to a first invention of the present invention, there is provided infrared shielding nanoparticles, which are nanoparticles of tungsten oxide expressed by a general formula $W_yO_z$ (wherein W is tungsten, O is oxygen, satisfying $2.2 \leq z/y \leq 2.999$) and/or composite tungsten oxide expressed by a general formula $M_xW_yO_z$ (wherein M is H, He, alkali metal, alkali earth metal, rare earth elements, one kind or two kinds or more of elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, W is tungsten, O is oxygen, (satisfying $0.001 \leq x/y \leq 1$, $2.2 \leq z/y \leq 3$), wherein an average primary particle size of the individual nanoparticle is 1 nm or more and 800 nm or less, and the surface of the nanoparticle is coated with a tetrafunctional silane compound expressed by a general formula $Si(OR)_4$ (wherein R is identical or different kind of 1-6C univalent hydrocarbon group) or its partial hydroyzate, and/or an organic metal compound.

According to a second invention, there is provided the infrared shielding nanoparticles according to the first invention, wherein the surface of the nanoparticle is coated with the tetrafunctional silane compound or its partial hydrolysis product and/or the organic metal compound with a film thickness of 5 nm or more and 30 nm or less.

According to a third invention, there is provided the infrared shielding nanoparticles according to the first or second invention, wherein the surface of the nanoparticle is coated with the tetrafunctional silane compound or its partial hydrolysis product and the organic metal compound.

According to a fourth invention, there is provided the infrared shielding nanoparticles according to the third invention, which is obtained by adding the organic metal compound into a dispersion liquid of the tungsten oxide nanoparticles and/or the composite tungsten oxide nanoparticles which are dispersed in an organic solvent to thereby obtain a mixture solution; then adding the tetrafunctional silane compound or its partial hydrolysis product thereto while stirring the mixture solution; then coating the surface of the composite tungsten nanoparticle with the tetrafunctional silane compound or its partial hydrolysis product, and the organic metal compound; and thereafter drying the mixture solution into a solid state; and pulverizing a solid matter thus obtained.

According to a fifth invention, there is provided the infrared shielding nanoparticles according to any one of the first to fourth inventions, wherein a particle size of the tungsten oxide and/or the composite tungsten oxide is 5 nm or more and 2 μm or less.

According to a sixth invention, there is provided the infrared shielding nanoparticles according to any one of the first to fifth inventions, wherein the organic metal compound is one kind or two kinds or more of a compound selected from an aluminum alcoholate compound or its polymer; cyclic aluminum oligomer; alkoxy group-containing aluminum xylate, a zirconium alcoholate compound or a polymer of them; a zirconium xylate compound; a titanium alcoholate compound; or a polymer of them; and a titanium xylate compound.

According to a seventh invention, there is provided the infrared shielding nanoparticles according to any one of the first to sixth inventions, wherein an addition amount of the organic metal compound is 0.05 pts.wt. to 300 pts.wt. expressed in terms of a metal element, based on 100 pts.wt. of the tungsten oxide nanoparticles and/or the composite tungsten oxide nanoparticles.

According to an eighth invention, there is provided the infrared shielding nanoparticles according to any one of the first to seventh inventions, wherein a ratio of the tetrafunctional silane compound or its partial hydrolysis product, with respect to the tungsten oxide and/or the composite tungsten oxide nanoparticles is 0.01 to 100 pts.wt. based on 1 pts.wt. of the tungsten oxide and/or the composite tungsten oxide nanoparticles, expressed in terms of silicon dioxide.

According to a ninth invention, there is provided the infrared shielding nanoparticles according to any one of the first to eighth inventions, wherein the tungsten oxide and/or the composite tungsten oxide micropaticles include a Magneli phase with a composition ratio expressed by a general formula $W_yO_z$ (wherein W is tungsten, O is oxygen, satisfying $2.45 \leq z/y \leq 2.999$).

According to a tenth invention, there is provided the infrared shielding nanoparticles according to any one of the first to ninth inventions, wherein the tungsten oxide nanoparticles are expressed by a general formula $M_xW_yO_z$, each having a crystal structure of one kind or two kinds or more selected from a hexagonal structure, a tetragonal structure, and a cubic structure.

According to an eleventh invention, there is provided the infrared shielding nanoparticles according to any one of the first to tenth inventions, wherein M is one kind or two kinds or more elements selected from a group consisting of Cs, Rb, K, Tl, In, Ba, Li, Ca, Sr, Fe, and Sn, and the individual composite tungsten oxide nanoparticle has a hexagonal crystal structure.

According to a twelfth invention, there is provided an infrared shielding nanoparticles dispersion, wherein the infrared shielding nanoparticles according to any one of the first to eleventh inventions are dispersed in a liquid medium or a solid medium.

According to a thirteenth invention, there is provided the infrared shielding nanoparticles, dispersion according to the twelfth invention, wherein the solid medium is resin or glass.

According to a fourteenth invention, there is provided the infrared shielding nanoparticles dispersion according to the twelfth or thirteenth invention, wherein the infrared shielding nanoparticles dispersion with the infrared shielding nanoparticles dispersed in the solid medium, is formed into a film shape or a board shape.

According to a fifteenth invention, there is provided the infrared shielding micropaticles dispersion according to the twelfth or thirteenth invention, wherein the infrared shielding nanoparticles dispersion with the infrared shielding nanoparticles dispersed in the solid medium, is formed into a powder shape.

According to a sixteenth invention, there is provided an infrared shielding nanoparticles dispersion, which is a kneaded molding of the powder-shaped infrared shielding nanoparticles dispersion of the fifteenth invention and a resin pellet.

According to a seventeenth invention, there is provided the infrared shielding nanoparticles dispersion according to the twelfth invention, wherein the liquid medium is one kind or more medium selected from an organic solvent, an organic solvent with resin dissolved therein, an organic solvent with resin dispersed therein, and water.

According to an eighteenth invention, there is provided an infrared shielding base material, wherein a surface of a base material is coated with one kind or more infrared shielding nanoparticles dispersions selected from the infrared shielding nanoparticles dispersion dispersed in the liquid medium of the twelfth invention, or the infrared shielding nanoparticles dispersion obtained by mixing the infrared shielding nanoparticles dispersed in the solid medium of the fifteenth invention into a liquid-state solvent, or the infrared shielding nanoparticles dispersion of the seventeenth invention, to thereby form a coating film thereon.

According to a nineteenth invention, there is provided an infrared shielding dispersion, which is the infrared shielding nanoparticles dispersion of the fourteenth invention, wherein when the dispersion is soaked into warm water of 65° C. for 7-days, with a visible light transmittance set to 70%, variation of the visible light transmittance before/after the soaking is 5 points or less.

According to a twentieth invention, there is provided the infrared shielding base material according to the eighteenth invention, wherein when the infrared shielding base material is soaked into warm water of 65° C. for 7-days with a visible light transmittance set to 70%, variation of the visible light transmittance before/after the soaking is 5 points or less.

According to a twenty-first invention, there is provided a manufacturing method of infrared shielding nanoparticles, comprising the steps of:

obtaining a dispersion liquid by dispersing in an organic solvent, tungsten oxide nanoparticles expressed by a general formula $W_yO_z$ (wherein W is tungsten, O is oxygen, satisfying $2.2 \leq z/y \leq 2.999$), and/or composite tungsten oxide nanoparticles expressed by a general formula $M_xW_yO_z$ (wherein M is H, He, alkali metal, alkali earth metal, rare earth elements, one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, ($0.001 \leq x/y \leq 1$, $2.2 \leq z/y \leq 3$);

adding and mixing into the dispersion liquid, a tetrafunctional silane compound expressed by a general formula $Si(OR)_4$ (wherein R is identical or different kind of 1-6C univalent hydrocarbon group) or its partial hydrolysis product, and/or adding and mixing an organic metal compound, to thereby coat a surface of the individual tungsten oxide nanoparticle and/or composite tungsten oxide nanoparticle with the tetrafunctional silane compound or its partial hydrolysis product, and/or the organic metal compound;

evaporating and removing the organic solvent and further applying heat treatment thereto, to thereby obtain a powder body of the tungsten oxide nanoparticles and/or the composite tungsten oxide nanoparticles coated with the tetrafunctional silane compound or its partial hydrolysis product and/or the organic metal compound; and pulverizing the powder body to thereby obtain the tungsten oxide nanoparticles and/or the composite tungsten oxide nanoparticles coated with the mono-dispersed tetrafunctional silane compound or its partial hydrolysis product and/or the organic metal compound.

According to a twenty-second invention, there is provided the manufacturing method of the infrared shielding nanoparticles according to the twenty-first invention, wherein in the step of adding and mixing the tetrafunctional silane compound or its partial hydrolysis product, and/or the organic metal compound, and coating the surface of the tungsten oxide nanoparticle and/or the composite tungsten oxide nanoparticle with the tetrafunctional silane compound or its partial hydrolysis product and/or the organic metal compound, first the organic metal compound is added and mixed into the dispersion liquid to thereby obtain a dispersion treated product containing the organic metal compound, and next, water is added and mixed into the dispersion treated product containing the organic metal compound, and further the tetrafunctional silane compound or its partial hydrolysis product is added and mixed to thereby obtain a dispersion liquid containing the organic metal compound, the tetrafunctional silane compound or its partial hydrolysis product.

Advantage of the Invention

The infrared shielding nanoparticles obtained by the present invention have high water-resistant property and excellent infrared shielding property which have not been provided heretofore. Further, the infrared shielding nanoparticles dispersion and the infrared shielding base material using the infrared shielding nanoparticles also have high water-resistant property and excellent infrared shielding property which have not been provided heretofore.

BRIEF DESCRIPTION OF THE DRAWINGS

FIG. 1 is a schematic plan view of a hexagonal crystal structure.

BEST MODE FOR CARRYING OUT THE INVENTION

Infrared shielding nanoparticles according to the present invention are tungsten oxide expressed by a general formula $WyOz$ (wherein W is tungsten, O is oxygen, satisfying $2.2 \leq z/y \leq 2.999$), and/or composite tungsten oxide expressed by a general formula $MxWyOz$ (wherein M is H, He, alkali metal, alkali earth metal, rare earth elements, one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, (satisfying $0.001 \leq x/y \leq 1$, $2.2 \leq z/y \leq 3$), wherein an average primary particle size of the individual nanoparticle is 1 nm or more and 800 nm or less, and a surface of the nanoparticle is coated with the tetrafunctional silane compound or its partial hydrolysis product, and/or an organic metal compound.

Note that in the present invention, "coating the surfaces of the tungsten oxide nanoparticle and the composite tungsten oxide nanoparticle, with the uniformly formed metal compound coating film, and/or tetrafunctional silane compound, or its partial hydrolysis product coating film, to give water-resistant property to the tungsten oxide nanoparticle and the composite tungsten oxide nanoparticle" is simply abbreviated as "surface coating" in some cases.

The present invention will be described in detail hereafter in an order of 1) tungsten oxide nanoparticles, composite tungsten oxide nanoparticles, 2) an organic metal compound, 3) a tetrafunctional silane compound or its partial hydrolysis product, 4) a coating method for coating the tungsten oxide nanopartilces and the composite tungsten oxide nanoparticles, with the organic metal compound, tetrafunctional silane compound or its partial hydrolysis product, 5) an infrared shielding nanoparticles dispersion obtained by using the infrared shielding nanoparticles of the present invention, an infrared shielding base material, and an article.

1) Tungsten Oxide Nanoparticles, Composite Tungsten Oxide Nanoparticles

Generally, it is known that a material containing free electrons exhibits reflection and absorption response to an electromagnetic wave in a surrounding area of the solar light with a wavelength of 200 nm to 2600 nm by plasma vibration. When powder formed of such a substance is defined as a nanoparticle with a particle size of smaller than a size of a wavelength of light, a geometrical scattering in a visible light region (380 nm to 780 nm) is reduced, and transparency of the visible light region can be obtained.

Note that in this specification, the term: "transparency" is used in the meaning that scattering to the light of the visible light region is reduced and transmittance is high.

Generally, since effective free electrons don't exist in $WO_3$, there is a low absorption and reflection property in a near infrared region. Therefore, $WO_3$ is not effective as an infrared shielding material.

Meanwhile, it is known that oxygen-depleted $WO_3$ and a so-called tungsten bronze with an electropositive element such as Na added to $WO_3$, are electroconductive materials, having free electrons. Then, a response of the free electrons to the light in the infrared region is suggested by an analysis of a single crystal, etc., of the material having such free electrons.

It is found by inventors of the present invention that there is a particularly effective range as the infrared shielding material, in a specific part of a composition range of the tungsten and oxygen, and an infrared shielding material nanoparticles dispersion with the tungsten oxide and/or the composite tungsten oxide nanoparticles dispersed therein is achieved, the tungsten oxide and the composite tungsten oxide exhibiting transparency in the visible light region and absorption in the near infrared region, or an infrared shielding base material manufactured by the infrared shielding material nanoparticles dispersion, is achieved.

The infrared shielding material nanoparticle of the present invention is tungsten oxide expressed by a general formula $WyOz$ (wherein W is tungsten, O is oxygen, satisfying $2.2 \leq z/y \leq 2.999$), and/or composite tungsten oxide expressed by a general formula $MxWyOz$ (wherein M is H, He, alkali metal, alkali earth metal, rare earth elements, and elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, ($0.001 \leq x/y \leq 1$, $2.2 \leq z/y \leq 3$).

In the tungsten oxide expressed by a general formula WyOz, the composition range of the tungsten and oxygen is as follows. Namely, a composition ratio of oxygen to tungsten is 3 or less, and further when the infrared shielding material is described as WyOz, a range of z/y is expressed by $2.2 \leq z/y \leq 2.999$. When a value of z/y is 2.2 or more, a crystal phase of $WO_2$, being outside of an object, can be prevented from appearing in the infrared shielding material, and a chemical stability as a material can be obtained. Therefore, the tungsten oxide can be used as an effective infrared shielding material. Meanwhile, when the value of z/y is 2.999 or less, free electrons of required quantities are generated, and an efficient infrared shielding material can be obtained.

Further, the free electrons are generated in the $WO_3$, by adding element M as will be described later to the $WO_3$, and absorption property derived from the free electrons appears in the near infrared region. Such an infrared shielding material is preferably effective as a near infrared absorption material in the vicinity of 1000 nm.

Here, by controlling the aforementioned oxygen amount and also adding elements that generate the free electrons, further efficient infrared shielding material can be obtained. When such an infrared shielding material obtained by controlling the oxygen amount and adding the elements that generate the free electrons is expressed by a general formula MxWyOz (wherein M is the element M, W is tungsten, and O is oxygen), the infrared shielding material satisfying a relation of $0.001 \leq x/y \leq 1$, $2.2 \leq z/y \leq 3.0$ is preferable.

First, a value of x/y showing an addition amount of the element M will be described.

When the value of x/y is larger than 0.001, a sufficient amount of free electrons are generated, and a target infrared ray shielding effect can be obtained. Then, as the addition amount of the element M is increased, a feeding amount of the free electrons is increased, and the infrared shielding efficiency is also increased. However, this effect is saturated when the value of x/y is about 1. Further, when the value of x/y is smaller than 1, preferably an impurity phase is prevented from being generated in the infrared shielding material.

Further, the element M is preferably H, He, alkali metal, alkali earth metal, rare earth elements, and one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I.

Here, from a viewpoint of stability, the element M in the MxWyOz with element M added thereto, is preferably alkali metal, alkali earth metal, rare earth elements, and one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I. From a viewpoint of improving optical properties and weather-resistant properties, the element M further preferably belongs to alkali earth metal elements, transition metal elements, 4B-group elements, and 5B-group elements.

Next, the value of z/y showing a control of an oxygen amount will be described. The value of z/y is preferably in a range of $2.2 \leq z/y \leq 3.0$, and further preferably in a range of $2.45 \leq z/y \leq 3.0$, because a mechanism similar to the mechanism of the infrared shielding material expressed by the aforementioned WyOz works in the infrared shielding material expressed by MxWyOz, and in a case of the value of z/y=3.0 as well, there is a feed of the free electrons by adding the element M as described above.

Further, when the aforementioned composite tungsten oxide nanoparticle has a hexagonal structure, the transmittance of the nanoparticle in the visible light region is improved, and the absorption in the near infrared region is improved. The hexagonal crystal structure will be described with reference to FIG. 1 which is a schematic plan view thereof. In FIG. 1, six octahedrons formed by $WO_6$ unit shown by reference mark 1, are aggregated to consitute a hexagonal void, constitute one unit by arranging element M shown by reference mark 2, and constitute a hexagonal crystal structure by aggregation of one unit.

In order to obtain an effect of improving the transmittance in the visible light region and improving the absorption in the near infrared region according to the present invention, a unit structure described in FIG. 1 is included in the composite tungsten oxide nanoparticles, the unit structure being the structure of constituting the hexagonal void by aggregating six octahedrons formed by $WO_6$ unit, and arranging the element M in this void. The composite tungsten oxide nanoparticles may be either one of crystalline and amorphous.

When electropositive ions of the element M are added and exist in the hexagonal void, the transmittance in the visible light region is improved, and the absorption of the near infrared region is improved. Here, generally, the hexagonal structure is formed when the element M with large ion radius is added. Specifically, the hexagonal structure is easily formed when Cs, K, Rb, Tl, In, Ba, and Sn are added. In an element excluding these elements as well, the element M exists in the hexagonal void formed by $WO_6$ unit, and the element is not limited to the aforementioned elements.

When the composite tungsten oxide nanoparticles having the hexagonal crystal structure have a uniform crystal structure, the addition amount of the additive element M is preferably 0.2 or more and 0.5 or less in x/y value, and further preferably is 0.33. By setting the x/y value to 0.33, it can be considered that the element M is arranged in all hexagonal voids.

Further, tetragonal and cubic tungsten bronze is also effective as the infrared shielding material, other than the hexagonal one. Owing to the crystal structure, there is a tendency that an absorption position in the near infrared region is varied, and there is a tendency that the absorption position is moved to a long wavelength side, in an order of the cubic structure<tetragonal structure<hexagonal structure. Further, the absorption in the visible light region is small in an order of the hexagonal structure, the tetragonal structure, and the cubic structure. Therefore, the hexagonal tungsten bronze is preferably used for the purpose of transmitting the light in the visible light region and shielding the light in the infrared region. However, the tendency of the optical property described here is absolutely a rough tendency, and is varied depending on the kind of the additive element, addition amount, and oxygen amount, and the present invention is not limited thereto.

The infrared shielding material of the present invention containing the tungsten oxide nanoparticles and/or the composite tungsten oxide nanoparticles absorbs largely the light in the near infrared region and particularly in the vicinity of 1000 nm, and therefore its transmission color tone is frequently a blue color tone to a green color tone.

Further, the particle size of the individual particle of the infrared shielding material can be selected respectively, depending on its use object. First, when used for maintaining the transparency, the particle of the infrared shielding material preferably has a particle size of 800 nm or less. This is because the particle with particle size of smaller than 800 nm does not completely shield the light by scattering, so that visibility in the visible light region is maintained and simultaneously the transparency can be efficiently maintained. Particularly, when the transparency in the visible light region is emphasized, the scattering by particles is further preferably taken into consideration.

When reduction of the scattering by the particles is emphasized, the particle size is preferably set to 200 nm or less and preferably set to 100 nm or less. This is because when the particle size is small, light scattering in the visible light region of 400 nm to 780 nm is reduced by geometrical scattering or Mie scattering, and as a result, it is possible to avoid a state that an infrared shielding film has an appearance of a frosted glass and clear transparency can not be obtained. Namely, when the particle size is 200 nm or less, the geometrical scattering or Mie scattering is reduced, and a Rayleigh scattering region is provided. In the Rayleigh scattering region, scattered light is reduced in inverse proportion to $6^{th}$ power of the particle size, and therefore scattering is reduced with reduction of the particle size, and the transparency is improved. Further, when the particle size is 100 nm or less, the scattered light is preferably extremely reduced. A smaller particle size is preferable from a viewpoint of avoiding scattering of the light, and when the particle size is 1 nm or more, an industrial manufacture is facilitated.

By selecting the particle size to be 800 nm or less, a haze value of the infrared shielding material nanoparticles dispersion with the infrared shielding material nanoparticles dispersed in a medium, can be set to 30% or less when the visible light transmittance is 85% or less. When the haze is a value larger than 30%, the infrared shielding film has an appearance of a frosted glass, and a clear transparency can not be obtained.

Further, in the tungsten oxide nanoparticles and/or the composite tungsten oxide nanoparticles, a so-called "Magneli phase" having a composition ratio expressed by $2.45 \leq z/y \leq 2.999$ in a general formula WyOz, is chemically stable and has an excellent absorption property in the near infrared region, and therefore is preferable as the infrared shielding material.

2) An Organic Metal Compound

An organic metal compound used in the present invention is preferably one kind, or two kinds or more selected from an aluminum alcoholate compound and its polymer, cyclic aluminum oligomer, an alcoxy group-containing aluminum xylate compound as an aluminum-based organic metal compound; a zirconium alcoholate compound and its polymer and a zirconium xylate compound as a zirconium-based organic metal compound; and titanium alcoholate compound and its polymer, and a titanium xylate compound as a titanium-based metal compound.

As the aluminum-based organic metal compound, an alkoxy group-containing aluminum xylate compound can be given, which is obtained by dissolving aluminum alcoholate into aprotic solvents, hydrocarbon-based solvents, petroleum-based solvents, ester-based solvents, ketone-based solvents, ether-based solvents, and amide-based solvents, etc., like aluminum alcoholate such as aluminum ethylate, aluminum isopropylate, aluminum sec-butyrate, mono-sec-butoxy aluminum diisopropylate or a polymer of them, cyclic aluminum oligomer such as cyclic aluminum oxide octilate, ethyl acetoacetate aluminum diisopropylate, aluminum tris (ethyl acetoacetate), octyl acetoacetate aluminum diisopropylate, stearyl aceto aluminum diisopropylate, aluminum mono acetyl acetonate bis(ethyl acetoacetate), aluminum tris (acetyl asetonate), then adding to this solution β-diketones, β-ketoesters, a monohydric or polyhydric alcohol, fatty acid, then heating this solution under reflux, and causing substation reaction of ligand.

Further, as the zirconium-based organic metal compound used in the present invention, zirconium alcoholate such as zirconium ethylate and zirconium butylate or a polymer of them, and a zirconium xylate compound such as zirconium tributoxy stearate, zirconium tetra acetyl acetate, zirconium tributoxy acetyl acetonate, zirconium dibutoxy bis(acetyl acetonate), zirconium tributoxy ethyl acetoacetate, zirconium butoxy acetyl acetonate bis(ethyl acetoacetate), can be given.

Further, as the titanium-based organic metal compound used in the present invention, titanium alcoholate such as methyl titanate, ethyl titanate, isopropyl titanate, butyl titanate, 2-ethyl hexyl titanate and a polymer of them, and a titanoxylate compound such as titanium acetyl acetonate, titanium tetra acetyl acetonate, titanium octylene glycolate, titanium ethyl acetoacetate, titanium lactate, titanium triethanol aminate, can be given.

The addition amount of the organic metal compound is 0.05 pts.wt. or more and 300 pts.wt. or less and is further preferably 0.3 pts.wt. or more and 150 pts.wt. or less expressed in terms of a metal element, based on 100 pts.wt. of the tungsten oxide nanoparticles and/or the composite tungsten oxide nanoparticles.

This is because when the organic metal compound is 0.05 pts.wt. or more, an effect of coating the surface is exhibited, and an effect of improving water-resistant property can be obtained.

Further, when the organic metal compound is 300 pts.wt. or less, an excessive adsorption amount on the tungsten oxide nanoparticles and the composite tungsten oxide nanoparticles can be avoided.

This is because when the adsorption amount on the tungsten oxide nanoparticles and/or the composite tungsten oxide nanoparticles of the organic metal compound is excessive, granulation of nanoparticles easily occurs during removal of the solvent through the organic metal compound, and such a case is desired to be prevented. Also, this is because excellent transparency can not be obtained in some cases depending on the purpose of use, because such a granulation of the nanoparticles is not desired. In addition, by such an excessive amount of the organic metal compound, considerable addition amount of the organic metal compound and a treatment time are required, and this is disadvantageous in terms of a productive cost. Therefore, the addition amount of the organic metal compound is preferably set to 300 pts.wt. or less from an industrial viewpoint.

3) Tetrafunctional Silane Compound or its Partial Hydrolysis Product

In the present invention, the tetrafunctional silane compound expressed by a general formula: $Si(OR)_4$ (wherein R is the same or different kind of 1-6C univalent hydrocarbon group) or its partial hydrolysis product is used. As specific examples of the tetrafunctional silane compound, tetra methoxy silane, tetra ethoxy silane, tetra propoxy silane, tetra butoxy silane, etc., can be given. Further, a silane monomer (or oligomer), being a silanol (Si—OH) group, which is obtained by hydrolyzing a part or a total amount of the alkoxy group of alkoxy silane monomers, and a polymer which is self-condensed through a hydrolytic reaction, can also be used.

Further, as the partial hydrolysis product of the tetrafunctional silane compound (there is no suitable technical term indicating an overall intermediary body of the tetrafunctional silane compound. Therefore, in the specification of the present invention, an overall silicate intermediary body, with the tetrafunctional silane compound used as a starting raw material, is described as "a partial hydrolysis product of the tetrafunctional silane compound".), silane monomer, being a silanol (Si—OH) group which is obtained by hydrolyzing a part or a total amount of the alkoxy group, tetramer and pentamer olygomers, and polymer (silicone resin) with a weight average mol.wt. (Mw) of about 800 to 8000 can be given.

Note that an alkoxysilyl group (Si—OR) in the alkoxy silane monomer is not converted to silanol (Si—OH) by entirely hydrolyzing the alkoxysilyl group in a process of hydrolyzation.

Further, the polymer of the partial hydrolysis product of the tetrafunctional silane compound shows a polymerization reaction: Si—OH+OH—Si→Si—O—Si+H$_2$O, or Si—OH+ OR—Si→Si—O—Si+ROH. Therefore, molecular amount of the partial hydrolysis product of the tetrafunctional silane compound is varied depending on a status of the polymerization reaction.

Generally, in a reaction system in the presence of the organic solvent such as an alcohol, even when required sufficient water exists in a system in terms of a stoichiometric composition, the alkoxysilyl group in the tetrafunctional silane compound, being a starting substance, is not entirely hydrolyzed, depending on the kind or a concentration of the organic solvent. Accordingly, even when heat treatment is finally applied to the partial hydrolysis product of the tetrafunctional silane compound, a state is considered to be set in an amorphous state in which carbon C is captured into its molecule.

Note that when a nitrogen-containing compound such as silazane is used as the tetrafunctional silane compound or its partial hydrolysis product of the present invention, a product having a certain degree of crystallinity is generated. However, when the nitrogen-containing compound such as silazane is used, a reaction control is difficult, and a cost of raw materials is high. Accordingly, the nitrogen-containing compound such as silazane is not included in a surface treatment agent of the present invention.

Here, when the tetrafunctional silane compound and a silane compound of trifunctionality or less wherein periphery of Si atom is surrounded by three or less (—OR), are compared, it is found that regarding reactivity (hydrolysis) of a general alkoxysilane compound, there is a great difference in a reaction rate between the trifunctionality or less and the tetrafunctionality, depending on a temperature or pH (catalyst), water or an organic solvent concentration, and the kind of the alkoxysilyl group such as a methoxy group and an ethoxy group. Namely, the reaction rate of the tetrafunctional silane compound is faster than that of the silane compound of trifunctionality or less. Then, in a case of the silane compound of trifunctionality or less, the reaction rate is different depending on the kind of the alkyl group, and generally as a molecular weight is increased, the reaction rate becomes slower due to steric hindrance.

In a case of silicate composed of the tetrafunctional silane compound used in the present invention, silicate is relatively stable if not set in a direct contact with water, and a reaction is extremely mild.

Meanwhile, in a case of the silane compound of trifunctionality or less, the reaction is excessively slow and is difficult to be controlled, and in addition, a portion of the alkyl group is not condensed, thus lowering a crosslink density. Therefore, a film quality of a coating film coating the surface of the tungsten oxide nanoparticle and/or the composite tungsten oxide nanoparticle is deteriorated, and this is not favorable.

Note that even in a case of the silane compound, titanate and zirconate, etc., are extremely easily hydrolyzed compared with silicate, and therefore the reaction is difficult to be controlled. Therefore, when the titanate or the zirconate composed of a multifunctional silane compound is used, preferably a relatively larger alkoxy group (isopropoxy, butoxy groups, etc.) is used, to thereby chelate a part of a functionality amount (the number of alkoxy groups) in a molecule.

In the present invention, the ratio of the tetrafunctional silane compound or its partial hydrolysis product, with respect to the tungsten oxide nanoparticles and/or the composite tungsten oxide nanoparticles, is preferably 0.01 pts.wt. or more and 100 pts.wt. or less against 1 pts.wt. tungsten oxide nanoparticles and/or composite tungsten oxide nanoparticles, based on silicon dioxide.

This is because when the ratio is 0.01 pts.wt. or more, an effect of coating the surface of the tungsten oxide nanoparticle and/or the composite tungsten oxide nanoparticle is exhibited and the water-resistant property can be obtained. Meanwhile, this is because when the ratio is 100 pts.wt. or less, improvement of the water-resistant property by coating the surface is not saturated, and improvement of a coating effect can be expected.

4) A Coating Method for Coating the Surface of the Tungsten Oxide Nanoparticle and/or the Composite Tungsten Oxide Nanoparticle, with the Organic Metal Compound, the Tetrafunctional Silane Compound, or its Partial Hydrolysis Product In the infrared shielding nanoparticle of the present invention, the surface of the tungsten oxide nanoparticle and/or the composite tungsten oxide nanoparticle is coated with the organic metal compound and/or the tetrafunctional silane compound or its partial hydrolysis product, and preferably a coating film of the organic metal compound and the tetrafunctional, silane compound or its partial hydrolysis product is formed thereon as a coating film.

Specifically, the tungsten oxide nanoparticles and/or the composite tungsten oxide nanoparticles each having an average primary particle size of 1 nm to 800 nm, are dispersed in a suitable solvent, and the tetrafunctional silane compound or its partial hydrolysis product and/or the organic metal compound is added thereto as a surface treatment agent, which are then mixed and stirred. Thus, the surface of the tungsten oxide nanoparticle and/or the composite tungsten oxide nanoparticle is coated with the coating film of the tetrafunctional silane compound or its partial hydrolysis product, and/or the organic metal compound. After coating, the solvent is evaporated and removed, and further for the purpose of increasing density of the coating film and improving the chemical stability, heat treatment is applied thereto, at a temperature of a thermal decomposition temperature or more of the tetranfunctinoal silane compound or its partial hydrolysis product or the organic metal compound, to thereby obtain a powder body. Dry-type and/or wet-type pulverization is applied to the obtained powder body, which is then dispersed again, so as not to damage the coated coating film.

In the present invention, preferably, the tungsten oxide and/or the composite tungsten oxide, being the infrared shielding particles, is previously crushed finely to an average primary particle size of 1 nm to 800 nm and is dispersed in a suitable solvent, thus previously setting the tungsten oxide nanoparticles and/or the composite tungsten oxide nanoparticles in a monodispersed state. Then, close attention is required during such a crushing and dispersion process, so that the dispersion state is not collapsed and agglomeration of nanoparticles does not occur. This is because when agglomeration of the tungsten oxide nanoparticles and/or the composite tungsten oxide nanoparticles occurs and the surface treatment needs to be applied onto the agglomeration of the nanoparticles in a process of the surface treatment, a sufficient water-resistant property is hardly obtained due to an exposed surface to which the surface treatment is not applied, when the tungsten oxide nanoparticles and/or the composite tungsten oxide nanoparticles is subjected to a crushing process such as re-dispersion as will be described later.

Namely, when the tetrafunctional silane compound or its partial hydrolysis product and/or the organic metal compound is added by performing the pulverization and dispersion process, an individual particle can be uniformly coated.

Here, based on a detailed study by inventors of the present invention, it is found that as the surface treatment agent of the present invention, a structure of using two kinds or more of the tetrafunctional silane compound or its partial hydrolysis product and the organic metal compound by combining them is preferable, other than a structure of using a material alone which is suitably selected from them.

Specifically, one kind or more are selected from the tetrafunctional silane compound or its partial hydrolysis product, and the organic metal compound respectively, which are then used as a mixture of two kinds or more compounds, or an addition process of two kinds or more compounds are separately performed, to thereby coat the surface of the tungsten oxide nanoparticle and/or the composite tungsten oxide nanoparticle, with a single-layer coating film of a composite material, or multi-layer coating film of two layers or more. Thus, further excellent water-resistant property can be obtained.

Further, based on a detailed study by the inventors of the present invention, a preferable structure is found in an addition method and an addition order of the tetrafunctional silane compound or its partial hydrolysis product and the organic metal compound.

Specifically, first, the tungsten oxide nanoparticles and/or the composite tungsten oxide nanoparticles are dispersed in the organic solvent to thereby prepare a dispersion liquid. Next, the organic metal compound is mixed and stirred into the dispersion liquid to thereby apply coating treatment to the individual nanoparticle, and further the tetrafunctional sialne compound or its partial hydrolysis product is dropped and mixed while stirring is continued, and by further continuing the stirring, the nanoparticle is coated with the tetrafunctional silane compound or its partial hydrolysis product.

Next, the organic solvent is evaporated and removed to thereby solidify the coating film, and further heat treatment is applied thereto at a temperature of a thermal decomposition temperature or more of the tetranfunctinoal silane compound or its partial hydrolysis product or the organic metal compound, and the density and the chemical stability of the coated coating film are improved. Thus, a powder body of coated nanoparticles is obtained. Dry-type and/or wet-type pulverization is applied to the obtained powder body, which is then dispersed again so as not to damage the coated coating film, to thereby obtain the infrared shielding nanoparticles of the present invention.

According to this method, although a detailed mechanism is not clear, coating is achieved by uniformly forming a strong coating film on the surface of the tungsten oxide nanoparticle and/or the composite tungsten oxide nanoparticle. Namely, according to this method, silane monomer is previously hydrolyzed, and the silane compound, which is subjected to a polymerization reaction, is not brought into contact with the tungsten oxide nanoparticles and/or the composite tungsten oxide nanoparticles, as is conventionally performed to the silane compound. According to this method, the tetrafunctional silane compound or its partial hydrolysis product is reacted with the tungsten oxide nanoparticles and/or the composite tungsten oxide nanoparticles, and simultaneously the tetrafunctional silane compound or its partial hydrolysis product itself is auto-condensed, to thereby gradually coat the surface of the tungsten oxide nanoparticle and/or the composite tungsten oxide nanoparticle. Then, coating treatment is performed in such a manner that the tetrafunctional silane compound or its partial hydrolysis product is slowly dropped, mixed, and stirred, so as to maintain the coating state, and heat treatment is applied thereto. By such an operation and reaction, it, can be considered that an unreacted reactive group is lost, which is remained in the tetrafunctional silane compound or its partial hydrolysis product, and binding of the nanoparticles in a powder state can be weakened.

Further, a process of pulverizing and re-dispersing the powder body by a dry process and/or a wet process so as not to damage the coating film of the coated nanoparticle, is an important process. The coated nanoparticles after coating process includes particles in a coagulated state of the coated nanoparticles, and when such particles are used for an optical material, transparency (haze), etc., is considered to be influenced thereby, thus requiring the crushing process. However, when pulverization with high load is carried out, the coating film formed on the surface of the tungsten oxide nanoparticle and/or the composite tungsten oxide nanoparticle is damaged. Therefore, an appropriate condition needs to be selected so as not to damage the coating film. By undergoing the aforementioned process, the infrared shielding nanoparticles of the present invention can be obtained. The obtained infrared shielding nanoparticles of the present invention can be used in a nanoparticle state as a raw material of an infrared shielding product, or in a state of dispersion into a liquid medium or a solid medium.

Note that as a solvent removing method, a filter press method, an ultrafiltration method, and a centrifugal separation method, etc., can be given, other than the aforementioned evaporation method. However, the solvent removing method is not limited thereto.

Further, as described above, the heat treatment after surface coating of the nanoparticle is performed at a thermal decomposition temperature or more of a surface treatment agent. However, both temperature of thermal decomposition and rate constant are different, depending on each compound, and therefore may be suitably selected in consideration of a heating atmosphere and a heat-resistant temperature of the tungsten oxide nanoparticles and/or the composite tungsten oxide nanoparticles.

5) An Infrared Shielding Nanoparticles Dispersion Obtained by using the infrared shielding nanoparticles, AN Infrared Shielding Base Material, and an Article a) Infrared Shielding Nanoparticles Dispersion in the infrared shielding nanoparticles dispersion of the present invention, the aforementioned infrared shielding material nanoparticles are dispersed in the liquid medium or the solid medium.

(i) A Case that the Infrared Shielding Nanoparticles are Dispersed in the Liquid Medium When the infrared shielding nanoparticles dispersion of the present invention is utilized in a state that the infrared shielding nanoparticles are dispersed in the liquid medium, one kind or more liquid medium selected from an organic solvent, an organic solvent with resin dissolved therein, an organic solvent with the resin dispersed therein, and water can be used as the liquid medium.

In order to obtain a dispersion with the infrared shielding nanoparticles of the present invention dispersed in the liquid medium, a method of obtaining the infrared shielding nanoparticles dispersion by adding the infrared shielding nanoparticles of the present invention into the liquid medium, can be used.

Further, in a process of manufacturing the infrared shielding nanoparticles of the present invention, it is also acceptable to use a method of obtaining the infrared shielding nanoparticles dispersion simultaneously with the aforementioned coating treatment. Namely, it is also acceptable to use a method of dispersing the tungsten oxide nanoparticles and/or the composite tungsten oxide nanoparticles before surface treatment and the surface treatment agent into the liquid medium such as alcohol and water, etc., and obtaining the dispersion with the tungsten oxide nanoparticles and/or the composite tungsten oxide nanoparticles coated by the surface treatment agent dispersed therein, simultaneously with the coating treatment.

The surface of an appropriate base material is coated with the infrared shielding nanoparticles dispersion of the present invention thus manufactured, and the coating film is formed thereon, so as to be utilized as the infrared shielding base material. Further, the infrared shielding nanoparticles dispersion is dried, heated, and pulverized so as to be used as a raw material of an infrared shielding product in a powder state. Namely, a powdery dispersion with the infrared shielding nanoparticles of the present invention dispersed in the solid medium is obtained, and the powdery dispersion with the infrared shielding nanoparticles dispersed in the solid medium may be dispersed in the liquid medium again, so as to be used as a dispersion liquid for the infrared shielding product, and also may be kneaded into resin as will be described later.

(ii) A Case that the Infrared Shielding Nanoparticles are Utilized in a State that the Infrared Shielding Nanoparticles are Dispersed in the Solid Medium When the infrared shielding nanoparticles dispersion of the present invention is utilized in a state that the infrared shielding nanoparticles are dispersed in the solid medium, it can be used as the infrared shielding product, etc., in a state that the infrared shielding nanoparticles are dispersed in the solid medium such as resin or glass.

The dispersion with the infrared shielding nanoparticles of the present invention dispersed in the solid medium, is not limited to the dispersion of the infrared shielding nanoparticles that exist in a film shape on the surface of the base material, or the dispersion in a powdery shape. For example, the dispersion may be formed so as to construct a film or a board with a thickness of 0.1 μm to 50 mm. Then, when the infrared shielding nanoparticles of the present invention are kneaded into resin and molded into the film or the board, the infrared shielding nanoparticles can be directly kneaded. Further, the dispersion with the infrared shielding nanoparticles dispersed in the liquid medium can be mixed with resin, or the powdery dispersion with the infrared shielding nanoparticles dispersed in the solid medium can be added to the liquid medium and mixed with resin.

Generally, when the infrared shielding nanoparticles of the present invention are kneaded into resin, the infrared shielding nanoparticles are heated at a temperature in the vicinity of a melting point of resin (around 200 to 300° C.), then mixed and kneaded into the resin. Further, the infrared shielding nanoparticles are formed into a pellet after mixing with resin, so that it can be formed into the film and the board by each system. For example, the film and the board can also be formed, by extrusion molding, inflation molding, solution casting, and casting, etc. Thicknesses of the film and the board at this time may be suitably set depending on the purpose of use, and a filler amount with respect to the resin (namely, a mixing amount of the infrared shielding nanoparticles of the present invention) can be varied according to a thickness of the base material and required optical properties and mechanical properties. However, generally, the filler amount is preferably 50 wt % or less with respect to the resin.

When the filler amount with respect to the resin is 50 wt. % or less, granulation of the nanoparticles in a resin matrix can be prevented, and therefore excellent transparency can be maintained. Further, use amount of the filler can be controlled, and this is advantageous in terms of a cost.

Further, the resin, being a matrix of the film and the board, is not particularly limited and can be selected according to the purpose of use. However, fluorine resin is effective in consideration of weather-resistance. Then, PET resin, acryl resin, polyamide resin, vinyl chloride resin, polycarbonate resin, olefin resin, epoxy resin, and polyimide resin, etc., can be given as resins inexpensive and having high transparency, compared with the fluorine resin.

In the film-shaped or the board-shaped infrared shielding nanoparticles dispersion with the infrared shielding nanoparticles dispersed in the solid medium, when the dispersion is soaked into warm water of 65° C. for 7-days with visible light transmittance set to 70%, variation of the visible light transmittance before and after the soaking is 5 points or less, thus exhibiting excellent water-resistant property. (In this specification, for example, when the visible light transmittance of a sample is varied from 70% to 75% after the aforementioned warm water soaking experiment, an increase amount of the visible light transmittance of the sample by warm water soaking is expressed by 75−70=5, and therefore described as 5 points.)

(iii) A Case that the Infrared Shielding Nanoparticles Dispersion with Infrared Shielding Nanoparticles Dispersed in the Solid Medium, is Utilized in a Further Crushed State to be Formed into a Powder Body The infrared shielding nanoparticles dispersion with infrared shielding nanoparticles dispersed in the solid medium according to the present invention can be utilized in a further crushed powder state. In such a powdery infrared shielding nanoparticles dispersion, the infrared shielding nanoparticles are already sufficiently dispersed in the solid medium. Accordingly, the infrared shielding nanoparticles dispersion in a liquid state or in a solid state can be easily manufactured by dissolving the powdery infrared shielding nanoparticles dispersion into a suitable liquid solvent or kneaded into a resin pellet, etc., as a so-called Master Batch.

b) An Infrared Shielding Base Material

In the infrared shielding base material of the present invention, the coating film containing the infrared shielding material nanoparticles of the present invention, is formed on the surface of the base material.

When the coating film containing the infrared shielding nanoparticles of the present invention, is formed on the surface of the base material, the infrared shielding base material excellent in water-resistant property and chemical stability and suitably utilized as the infrared shielding material, can be obtained.

For example, there is the infrared shielding base material wherein the dispersion is obtained by mixing the infrared shielding nanoparticles with an organic solvent such as alcohol or a liquid medium such as water, a resin binder, or a dispersion in some cases, and the surface of the base material is suitably coated with this dispersion, then heat treatment is applied to the liquid medium to thereby remove the liquid medium, and the infrared shielding nanoparticles are directly laminated on the surface of the base material.

Note that a component of the aforementioned resin binder can be selected according to the purpose of use, and ultraviolet curing resin, thermosetting resin, normal temperature curing resin, and thermoplastic resin can be selected. Further, when the dispersion using the liquid medium not containing the resin binder component, a similar infrared shielding base material can be obtained even when an upper layer is coated with the liquid medium containing a component such as resin after an infrared shielding nanoparticles group is laminated on the surface of the base material.

Specifically, the infrared shielding base material with the coating film formed on the surface of the base material can be given, wherein the surface of the base material is coated with the infrared shielding nanoparticles dispersion in a liquid state, with infrared shielding material nanoparticles dispersed in one kind or more liquid media selected from the organic solvent, the organic solvent with resin dissolved therein, the organic solvent with resin dispersed therein, and water. Further, the infrared shielding base material can also be given, with the coating film formed on the surface of the base material, wherein the surface of the base material is coated with the infrared shielding nanoparticles dispersion in a liquid state which is mixed with the solvent. Further, the infrared shielding base material with the coating film formed on the surface of the base material can also be given, wherein the surface of the base material is coated with the infrared shielding nanoparticles dispersion in a liquid state in which the infrared shielding nanoparticles dispersion with the infrared shielding nanoparticles dispersed in a powdery solid medium, is mixed with the solvent. Of course, the infrared shielding base material with the coating film formed on the surface of the base material can also be given, wherein two kinds or three kinds of the aforementioned infrared shielding nanoparticles dispersions are mixed in a liquid state.

In the infrared shielding base material, when the infrared shielding base material is soaked into warm water of 65° C. for 7-days with the visible light transmittance set to 70%, variation of the visible light transmittance before/after the soaking is 5 points or less, thus exhibiting excellent water-resistant property.

Meanwhile, quality of the base material of the present invention is not particularly limited, provided that it is transparent. However, glass or a resin sheet, and a resin film are preferably used. The resin film is not particularly limited, provided that no trouble occurs in a required surface state and in durability of a film. For example, there is a film formed of polyester-based polymers such as polyethylene terephthalate and polyethylene naphthalate, cellulose-based polymers such as cellulose diacetate and triacetyl cellulose, polycarbonate polymer, acrylic polymer such as poly methyl methacrylate, stylene-based polymers such as polystylene and acrylonitrile/stylene copolymer, polyethylene, polypropylene, olefin-based polymer such as polyolefine having cyclic or norbornene structure, ethylene/propylene copolymers, vinyl chloride-based polymer, amid-based polymer such as aromatic polyamide, imide-based polymer, sulfone-based polymer, polyether sulfone-based polymer, polyether ether ketone-based polymer, polyphenylene sulfide-based polymer, vinyl alcohol-based polymer, vinylidene chloride-based polymer, vinyl butyral-based polymer, acrylate-based polymer, polyoximethylen-based polymer, epoxy-based polymer, and transparent polymer such as two-dimensional system, three-dimensional system each kind of copolymer and graft copolymer. Particularly, polyester-based biaxially oriented film such as polyethylene terephthalate, polybutylene terephthalate, or polyethylene-2,6-naphthalte, is suitable in the point of mechanical property, optical property, heat-resistance, and economic efficiency. Such a polyster-based biaxially oriented film may be a copolymer polyester-based film.

c) An Article Formed by Using the Infrared Shielding Nanoparticle Dispersion

By using the infrared shielding nanoparticles dispersion of the present invention, an infrared shielding article such as a film and a board can be obtained, which is excellent in water-resistant property and chemical stability.

Such an infrared shielding article is used for a window material, etc., of each kind of building or a vehicle, for the purpose of shielding the light in the near infrared region while sufficiently capturing visible light beams, and suppressing a rise of a temperature in a room while maintaining brightness, and can be used for PDP (Plasma Display Panel), and is used for shielding near infrared rays emitted frontward from the PDP.

EXAMPLES

Next, the tungsten oxide nanoparticles and/or the composite tungsten oxide nanoparticles which are subjected to surface treatment according to the present invention, will be described based on a specific example. However, the present invention is not limited to the following example.

In this example, visible light transmittance (VLT) means an integrated value of a quantity of a transmitted light of a radiation light (having a wavelength of 380 nm to 780 nm) capable of causing a visual sense to occur through a human visual organ, and is a value calculated by a spectral distribution of D65 light source and a weight value coefficient which is obtained by a standard relative luminosity. Further, solar transmittance (ST) means the integrated value of the quantities of the transmitted light in a range from the visible light to the transmitted light in the near infrared region (wavelength of 350 nm to 2100 nm), and is a value calculated by the weight value coefficient which is obtained from the spectral distribution of the D65 light source. VLT and ST are both measured by a method based on JIS A 5759 (wherein measurement is performed only by a film which is not adhered to a glass).

A haze value of the film was measured based on JIS K 7105.

An average dispersion particle size was obtained as an average value measured by a measuring instrument by using a dynamic light scattering method (ELS-800 by OTSUKA ELECTRONICS CO., LTD.).

In an evaluation method of the water-resistant property, when the infrared shielding film is soaked into warm water of 65° C. for 7 days with visible light transmittance set to 70%, a sample with variation of the transmittance of 5 points or less is evaluated to be excellent, and a sample with variation exceeding 5 points is evaluated to be failure.

Note that an optical property value (visible light transmittance and a haze value) of a film called here, shows a value including a base film (PET film with a thickness of 100 μm, product name: Tetron (trademark) HLEW produced by Tejin Dupont Films Corporation), and the visible light transmittance of the base film itself is 90% and the haze value is 1.9%.

Example 1

$Cs_{0.33}WO_3$ powder (by Sumitomo Metal Mining CO., Ltd.):520 g was mixed and stirred into isopropyl alcohol (IPA):3480 g, which was then dispersed by a medium stirring mill, to thereby prepare a dispersion liquid A.

Subsequently, the dispersion liquid A:200 g, ethyl acetoacetatoaluminum diisopropylate (by Kawaken Fine Chemical Co., Ltd., product name:Almi Chelate ALCH):20 g, and IPA:

540 g were mixed and stirred, which was then dispersed by using a ultrasonic Homogenizer.

Subsequently, water:100 g was dropped and added to such a dispersed material for 1 hour while stirring the dispersed material, and tetraethoxysilane (by Tama Chemical Co., Ltd., ethyl orthosilicate, in terms of SiO2:28.8%):140 g was dropped and added for 2 hours, which was then stirred for 15 hours at 20° C., and thereafter this liquid was heated and aged for 2 hours at 70° C.

Subsequently, the aged liquid was vacuum-dried to thereby evaporate a solvent, and thereafter dry-type pulverization was applied to a powder body obtained by heat treatment at 200° C. for 1 hour, to thereby obtain $Cs_{0.33}WO_3$ nanoparticle coated with about 5 wt % $Al_2O_3$ and about twice weight of $SiO_2$ with respect to the $Cs_{0.33}WO_3$ nanoparticle.

Such $Al_2O_3/SiO_2$ coated $Cs_{0.33}WO_3$ nanoparticle:8 g, organic dispersant:8 g, and toluene:84 g were mixed, and wet-type dispersion treatment was applied thereto by a medium stirring mill, to thereby prepare a dispersion liquid with an average dispersion particle size of 100 nm.

When TEM observation was carried out for the $Al_2O_3/SiO_2$ coated $Cs_{0.33}WO_3$ nanoparticle dispersed in the dispersion liquid, it was found that the surface of the $Cs_{0.33}WO_3$ nanoparticle was uniformly coated with a coating film in a range of 5 nm to 30 nm, without exposing the surface of the $Cs_{0.33}WO_3$ nanoparticle. Further, when a composition analysis was carried out for the individual nanoparticles dispersed in the dispersion liquid by using an energy dispersive X-ray spectroscopy (described as EDS hereafter), deposition of a solid particle composed of coating components ($Al_2O_3/SiO_2$) only was not confirmed.

Such dispersion liquid:2 g and UV ray curing resin (by Toagosei Co., Ltd., product name UV3701):2 g were mixed to thereby obtain a coating liquid.

The coating liquid was used to form a film on the PET film with a thickness of 100 µm prepared as a base material, by using a bar coater (#20). Then, the film thus obtained was dried at 70° C. for 1 minute, and the solvent was evaporated, and thereafter the film was irradiated with ultraviolet ray by using a high pressure mercury lamp, to thereby obtain an infrared shielding film.

When the optical property of the infrared shielding film was measured, it was found that solar transmittance was 35%, and the film had a practical infrared shielding property. Further, it was found that a visible light transmittance was 70%, and the light in the visible light region was sufficiently transmitted. In addition, haze was 2.4%, and it was confirmed that transparency was extremely high, and an, internal state could be clearly confirmed from outside. Transmittance color tone was a beautiful blue color.

When the visible light transmittance was measured after the infrared shielding film was soaked into warm water of 65° C. for 7 days, it was found that the visible light transmittance was 70.5% and haze was 2.5%. The increase amount of the visible light transmittance by soaking into warm water was 0.5 points and small, and variation of the haze was also small.

Comparative Example 1

IPA-58 g, water-7.2 g, and 10 wt % of $HNO_3$-0.1 g were mixed, and tetraethoxysilane (by Tama Chemical Co., Ltd., ethyl orthosilicate, in terms of $SiO_2$:28.8%):34.72 g was dropped and added for 2 hours, which was then stirred for 15 hours at 20° C., to thereby obtain 10 wt % of silicate solution (liquid B):100 g in terms of $SiO_2$.

Subsequently, the silicate solution thus obtained was stirred and mixed with IPA unlike the example 1, and the liquid B was added to $Cs_{0.33}WO_3$ powder (by Sumitomo Metal Mining CO., Ltd.):5 g, which was not dispersed by using a medium stirring mill, and was mixed for 30 minutes, with the number of stirring rotations set to 1000 rpm at a room temperature (25° C.) by using a Henschel mixer, which was then stirred for 1 hour by raising the temperature to 60° C. and raising the number of rotations to 2000 rpm, to thereby obtain $Cs_{0.33}WO_3$ nanoparticle dispersion liquid coated with $SiO_2$ having a weigh of about twice the weight of $Cs_{0.33}WO_3$ nanoparticle. Unlike the Example 1, the obtained powder body was dispersed only by mixing and stirring, without performing the wet-type pulverization.

An average dispersed particle size of the $Cs_{0.33}WO_3$ nanoparticle coated with $SiO_2$ at this time was 460 nm. When TEM observation was carried out for the $Cs_{0.33}WO_3$ nanoparticle coated with $SiO_2$ dispersed in the dispersion liquid, an agglutinated state was observed in which 5 to 30 $Cs_{0.33}WO_3$ nanoparticles coated with a silica coating film in a range of 5 nm to 30 nm were agglutinated.

The $Cs_{0.33}WO_3$ nanoparticles dispersion liquid:2 g coated with $SiO_2$ and UV ray curing resin (by Toagosei Co., Ltd., product name UV3701):2 g were mixed to thereby obtain a coating liquid.

The coating liquid was used to form a film on the PET film with a thickness of 100 µm prepared as a base material, by using a bar coater (#20). Then, the film thus obtained was dried at 70° C. for 1 minute, and the solvent was evaporated, and thereafter the film was irradiated with ultraviolet ray by using a high pressure mercury lamp, to thereby obtain an infrared shielding film.

When the optical property of the infrared shielding film was measured, it was found that the solar transmittance was 37% and the infrared shielding film had a practical infrared shielding property. The visible light transmittance was 70.3% and although the light in the visible light region was sufficiently transmitted, haze was 25.9% m and the transparency was evaluated to be failure. When the infrared shielding film was soaked into warm water of 65° C. for 7 days and the visible light transmittance was measured, it was found that the visible light transmittance was 79.0%, and haze was 30.3%. The increase amount of the visible light transmittance by soaking into warm water was 8.7 points and large. Therefore, the water-resistant property of coating was evaluated to be failure.

In Comparative Example 1, it can be considered that an individual particle is not uniformly coated, and both primary particle and secondary particle have a large particle size, and therefore the practical transparency can not be obtained.

Example 2

Similarly to the Example 1, surface coating by silica was performed excluding a point that the dispersion liquid A:200 g and zirconium tributoxy acetylacetonate (by Matsumoto Trading Co., Ltd., product name:ZC-540):20 g, and IPA:540 g were mixed and stirred, to thereby obtain the $Cs_{0.33}WO_3$ nanoparticle coated with $SiO_2$ having a weight of about twice the weight of $ZrO_2$ of about 5 wt % with respect to the $Cs_{0.33}WO_3$ nanoparticle.

The $ZrO_2/SiO_2$ coated $Cs_{0.33}WO_3$ nanoparticle:8 g, organic dispersant:8 g, and toluene:84 g were mixed and dispersion treatment was applied thereto, to thereby prepare dispersion liquid with an average dispersion particle size of 100 nm. When TEM observation was performed to the surface-treated $Cs_{0.33}WO_3$ nanoparticles dispersed in the dispersion liquid, it was found that the $Cs_{0.33}WO_3$ nanoparticles were uniformly coated with a coating film in a range of 5 nm to 30 nm, without exposing the surface thereof.

Further, when the composition analysis was performed to the individual nanoparticles dispersed in the dispersion liquid, the deposition of the solid particle composed of the coating film composition ($ZrO_2/SiO_2$) only was not confirmed.

The dispersion liquid:2 g and the UV ray curing resin (by Toagosei Co., Ltd., product name UV3701):2 g were mixed to thereby obtain a coating liquid.

The coating liquid was used to form a film on the PET film with a thickness of 100 μm prepared as a base material by using a bar coater (#20). Then, the film thus obtained was dried at 70° C. for 1 minute, the solvent was evaporated, and thereafter the film was irradiated with ultraviolet ray by using a high pressure mercury lamp, to thereby obtain an infrared shielding film.

When the optical property of the infrared shielding film was measured, it was found that the solar transmittance was 35% and the film had a practical infrared shielding property. It was also found that the visible light transmittance was 70%, and the light in the visible light region was sufficiently transmitted. Further, haze was 2.6%, and the transparency was extremely high, and an internal state could be clearly confirmed from outside. The transmittance color tone was a beautiful blue color.

When the visible light transmittance was measured after the infrared shielding film was soaked into warm water of 65° C. for 7 days, it was found that the visible light transmittance was 71.3% and haze was 2.7%. It was also found that the increase amount of the visible light transmittance by soaking into warm water was 1.3 points and was small, and variation of the haze was also small.

Example 3

Similarly to the Example 1, surface coating by silica was performed excluding a point that the dispersion liquid A:200 g and tetra-n-butyl titanate (by Matsumoto Trading Co., Ltd., product name:TA-25):20 g, and IPA:540 g were mixed and stirred, and dispersion treatment was applied thereto by using the ultrasonic Homogenizer, to thereby obtain the $Cs_{0.33}WO_3$ nanoparticle coated with $SiO_2$ having a weight of about twice the weight of $ZrO_2$ of about 5 wt % with respect to the $Cs_{0.33}WO_3$ nanoparticle.

The $TiO_2/SiO_2$ coated $Cs_{0.33}WO_2$ nanoparticles:8 g, organic dispersant:8 g, and toluene:84 g were mixed, and dispersion treatment was applied thereto, to thereby prepare the dispersion liquid with an average dispersion particle size of 100 nm.

When TEM observation was performed to the $TiO_2/SiO_2$ coated $Cs_{0.33}WO_3$ nanoparticles dispersed in the dispersion liquid, it was found that the $Cs_{0.33}WO_3$ nanoparticle was uniformly coated with the coating film in a range of 5 nm to 30 nm without exposing the surface thereof.

When the composition analysis was performed to the individual nanoparticle dispersed in the dispersion liquid by using EDS, the deposition of the solid particle composed of the coating film component ($TiO_2/SiO_2$) only was not confirmed.

This liquid:2 g and the UV ray curing resin (by Toagosei Co., Ltd., product name UV3701):2 g were mixed to thereby obtain a coating liquid.

The coating liquid was used to form a film on the PET film with a thickness of 100 μm prepared as a base material by using a bar coater #20). Then, the film thus obtained was dried at 70° C. for 1 minute, and the solvent was evaporated, and thereafter the film was irradiated with ultraviolet ray by using a high pressure mercury lamp, to thereby obtain a cured film. When the optical property of the infrared shielding film was measured, it was found that the solar transmittance was 35% and the film had a practical infrared shielding property. It was also found that the visible light transmittance was 70%, and the light in the visible light region was sufficiently transmitted. In addition, haze was 2.6%, and it was confirmed that transparency was extremely high, and an internal state could be clearly confirmed from outside. Transmittance color tone was a beautiful blue color.

When the visible light transmittance was measured after the infrared shielding film was soaked into warm water of 65° C. for 7 days, it was found that the visible light transmittance was 72.1% and the haze was 2.8%. The increase amount of the visible light transmittance by soaking into warm water was 2.1 points and small, and variation of the haze was also small.

Comparative Example 2

The dispersion liquid A:0.4 g, toluene:1.6 g, and UV ray curing resin (by Toagosei Co., Ltd., product name UV3701):2 g were mixed to thereby obtain a coating liquid.

The coating liquid was used to form a film on the PET film with a thickness of 104 μm prepared as a base material by using a bar coater (#20). Then, the film thus obtained was dried at 70° C. for 1 minute, and the solvent was evaporated, and thereafter the film was irradiated with ultraviolet ray by using a high pressure mercury lamp, to thereby obtain a cured film. When the optical property of the infrared shielding film was measured, it was found that the solar transmittance was 35% and the film had a practical infrared shielding property. It was also found that the visible light transmittance was 70% and the light in the visible light region was sufficiently transmitted. In addition, haze was 2.3%, and it was confirmed that transparency was extremely high, and the internal state could be clearly confirmed from outside. Transmittance color tone was a beautiful blue color.

When the infrared shielding film was soaked into warm water of 65° C. for 7 days and the visible light transmittance was measured, it was found that the visible light transmittance was 76.2%, and haze was 2.8%. The increase amount of the visible light transmittance by soaking into warm water was 6.2 points and large. Therefore, the water-resistant property of coating was evaluated to be failure.

Example 4

The dispersion liquid A:200 g, ethyl acetoacetatoaluminum diisopropylate (by Kawaken Fine Chemical Co., Ltd., product name:Almi Chelate ALCH):20 g, and IPA:540 g were mixed and stirred, which was then dispersed by using a ultrasonic Homogenizer.

Subsequently, water:100 g was dropped and added to such a dispersed material for 1 hour while stirring the dispersed material, and tetraethoxysilane (by Tama Chemical Co., Ltd., ethyl orthosilicate, in terms of $SiO_2$:26.8%):140 g was dropped and added for 2 hours, which was then stirred for 15 hours at 20° C., and thereafter this liquid was heated and aged for 2 hours at 70° C.

Subsequently, the aged liquid was vacuum-dried to thereby evaporate a solvent, and thereafter dry-type pulverization was applied to a powder body obtained by heat treatment at 200° C. for 1 hour, to thereby obtain $Cs_{0.33}WO_3$ nanoparticle coated with about 5 wt % $Al_2O_3$ and about twice weight $SiO_2$ with respect to the $Cs_{0.33}WO_3$ nanoparticles.

When TEM observation was carried out for the $Al_2O_3/SiO_2$ coated $Cs_{0.33}WO_3$ nanoparticles dispersed in the dispersion liquid, it was found that the surface of the $Cs_{0.33}WO_3$ nanoparticle was uniformly coated with a coating film in a range of 5 nm to 30 nm, without exposing the surface of the $Cs_{0.33}WO_3$ nanoparticle. Further, when the composition analysis was carried out for the individual nanoparticles dispersed in the dispersion liquid by using an energy dispersive X-ray spectroscopy (described as EDS hereafter), deposition of a solid particle composed of coating components ($Al_2O_3/SiO_2$) only was not confirmed.

The $Al_2O_3/SiO_2$ coated $Cs_{0.33}WO_3$ nanoparticle:8 g, organic dispersant:8 g, and toluene:84 g were mixed, and dispersion treatment was applied thereto, to thereby prepare a dispersion liquid with an average dispersion particle size of 100 nm. Then, the solvent was removed from the dispersion liquid by a drum-type dryer, to thereby obtain powder body A with a particle size of 2 μm composed of surface-treated $Cs_{0.33}WO_3$ nanoparticles and a heating residue of the organic dispersant.

The powder body A:0.01 kg and ETFE (tetra fluoroethylene-ethylene copolymer) resin:8.7 kg were subjected to dry-type mixing by V-blender, and thereafter sealed mixture was sufficiently performed at 320° C. in the vicinity of a melting temperature of ETFE resin, and a mixture thus obtained was pushed out at 320° C. and was molded into a film of about 100 μm.

The solar transmittance of the film was 36%, and the film had a practical infrared shielding property. The visible light transmittance was 70.2% and haze was 0.8%.

Next, when the visible light transmittance was measured after the infrared shielding film was soaked into warm water of 65° C. for 7 days, it was found that the visible light transmittance was 70.3% and haze was 10.1%. The increase amount of the visible light transmittance by soaking into warm water was 0.1 points and small, and variation of the haze was also small, and it was found that the water-resistant property of the film was extremely excellent.

Example 5

The powder body A:0.01 kg and PET resin:8.7 kg were subjected to dry-type mixing by V-blender, and thereafter sealed mixture was sufficiently performed at 320° C. in the vicinity of the melting temperature of ETFE resin, and a mixture thus obtained was pushed out at 300° C. and was molded into a film of about 100 μm.

It was found that the solar transmittance of the film was 36%, and the film had a practical infrared shielding property. The visible light transmittance was 70.8% and haze was 1.8%.

Next, when the visible light transmittance was measured after the infrared shielding film was soaked into warm water of 65° C. for 7 days, it was found that the visible light transmittance was 71.6% and haze was 2.2%. The increase amount of the visible light transmittance by soaking into warm water was 0.8 points and small, and variation of the haze was also small, and the water-resistant property of the film was extremely excellent.

Comparative Example 3

The dispersion liquid A:40 g, organic dispersant:4 g, and toluene:56 g were mixed, and the solvent was removed by using a drum-type dryer, to thereby obtain powder body B with a particle size of 2 μm composed of the $Cs_{0.33}WO_3$ nanoparticles and the heating residue of the organic dispersant.

The powder body B:0.01 kg and ETFE (tetrafluoroethylene-ethylene copolymer) resin:8.7 kg were subjected to dry-type mixing by V-blender, and thereafter sufficiently subjected to sealed-mixing at 320° C. in the vicinity of the melting temperature of the ETFE resin. Then, a mixture thus obtained was pushed out at 320° C. and was molded into a film of about 100 μm. The visible light transmittance at this time was 69.9%, and haze was 8.8%.

When the visible light transmittance of the film was measured after 7-days soaking of the film into warm water of 65° C., it was found that the solar transmittance was 43%, the visible light transmittance was 75.1%, and haze was 14.5%. The increase amount of the visible light transmittance by warm water soaking was 5.2 points and the variation of the haze was relatively large, and the water-resistant property of the film was evaluated to be failure.

TABLE 1

| Sample | Coating | Infrared shielding nanoparticle | Binder resin | Base material resin | Film resin | Visible light (%) transmittance Before soaking | Visible light (%) transmittance After soaking | Haze (%) Before soaking | Haze (%) After soaking |
|---|---|---|---|---|---|---|---|---|---|
| Example 1 | $Al_2O_3/SiO_2$ | $Cs_{0.33}WO_3$ | UV curing resin | PET resin | — | 70 | 70.5 | 2.4 | 2.5 |
| Com ex.*1 | $SiO_2$ | $Cs_{0.33}WO_3$ | UV curing resin | PET resin | — | 70.3 | 79.0 | 25.9 | 30.3 |
| Example 2 | $ZrO_2/SiO_2$ | $Cs_{0.33}WO_3$ | UV curing resin | PET resin | — | 70 | 71.3 | 2.6 | 2.7 |
| Example 3 | $TiO_2/SiO_2$ | $Cs_{0.33}WO_3$ | UV curing resin | PET resin | — | 70 | 72.1 | 2.6 | 2.8 |
| Com ex.*2 | — | $Cs_{0.33}WO_3$ | UV curing resin | PET resin | — | 70 | 76.2 | 2.3 | 2.8 |
| Example 4 | $Al_2O_3/SiO_2$ | $Cs_{0.33}WO_3$ | — | — | ETFE | 70.2 | 70.3 | 9.8 | 10.1 |
| Example 5 | $Al_2O_3/SiO_2$ | $Cs_{0.33}WO_3$ | — | — | PET resin | 70.8 | 71.6 | 1.8 | 2.2 |
| Com ex.*3 | — | $Cs_{0.33}WO_3$ | — | — | ETFE | 69.9 | 75.1 | 8.8 | 14.5 | wherein ETFE: tetrafluoroethylene-ethylene copolymer
Com ex.*—Comparative example

The invention claimed is:

1. Infrared shielding nanoparticles, comprising nanoparticles of: tungsten oxide expressed by a general formula $W_yO_z$, where: W is tungsten, O is oxygen, and y and z satisfy $2.2 \leq z/y \leq 2.999$; and/or composite tungsten oxide expressed by a general formula $M_xW_yO_z$, where: M is H, an alkali metal, an alkali earth metal, a rare earth element, or one or more elements selected from the group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, and x, y, and z satisfy $0.001 \leq x/y \leq 1$ and $2.2 \leq z/y \leq 3$; wherein: an average primary particle size of individual nanoparticles is 1 nm or more and 800 nm or less, and a surface of the nanoparticle is coated with: a first coating film comprising an organic metal compound, and a second coating film coating the first coating film, the second coating film comprising: a tetrafunctional silane compound expressed by a general formula $Si(OR)_4$, where each R is an identical or a different univalent hydrocarbon group having 1 to 6 carbon atoms or a partial hydrolysis product of the tetrafunctional silane compound, and the organic metal compound; wherein a combined thickness of the first and second coating films coating the surface of the nanoparticle is 5 nm or more and 30 nm or less; and wherein an addition amount of the organic metal compound is 0.05 parts by weight to 300 parts by weight expressed in terms of a metal element, based on 100 parts by weight of the tungsten oxide nanoparticles and/or the composite tungsten oxide nanoparticles.

2. The infrared shielding nanoparticles according to claim 1, which are obtained by:
    adding the organic metal compound into a dispersion liquid of the tungsten oxide nanoparticles and/or the composite tungsten oxide nanoparticles which are dispersed in an organic solvent to thereby obtain a mixture solution; then
    adding the tetrafunctional silane compound or the partial hydrolysis product of the tetrafunctional silane compound while stirring the mixture solution; then
    coating the surface of the composite tungsten nanoparticle with the tetrafunctional silane compound or the partial hydrolysis product of the tetrafunctional silane compound, and the organic metal compound; and thereafter
    drying the mixture solution into a solid state; and
    pulverizing a solid matter thus obtained.

3. The infrared shielding nanoparticles according to claim 1, wherein a particle size of the tungsten oxide and/or the composite tungsten oxide is 5 nm or more and 2 μm or less.

4. The infrared shielding nanoparticles according to claim 1, wherein the organic metal compound is one or more compounds selected from the group consisting of: aluminum alcoholate compounds and polymers thereof; cyclic aluminum oligomers; alkoxy group-containing aluminum chelate compounds; zirconium alcoholate compounds and polymers thereof; zirconium chelate compounds; titanium alcoholate compounds and polymers thereof; and titanium chelate compounds.

5. The infrared shielding nanoparticles according to claim 1, wherein a ratio of the tetrafunctional silane compound or the partial hydrolysis product thereof, with respect to the tungsten oxide and/or the composite tungsten oxide nanoparticles is 0.01 to 100 parts by weight based on 1 parts by weight of the tungsten oxide and/or the composite tungsten oxide nanoparticles, expressed in terms of silicon dioxide.

6. The infrared shielding nanoparticles according to claim 1, wherein the tungsten oxide and/or the composite tungsten oxide nanopaticles include a Magneli phase with a composition ratio expressed by a general formula WyOz where:
    W is tungsten,
    O is oxygen, and
    y and z satisfy $2.45 \leq z/y \leq 2.999$.

7. The infrared shielding nanoparticles according to claim 1, wherein the tungsten oxide nanoparticles are expressed by a general formula MxWyOz, each nanoparticle independently having a crystal structure selected from the group consisting of a hexagonal structure, a tetragonal structure, and a cubic structure.

8. The infrared shielding nanoparticles according to claim 1, wherein:
    M is one or more elements selected from the group consisting of Cs, Rb, K, Tl, In, Ba, Li, Ca, Sr, Fe, and Sn, and
    each individual composite tungsten oxide nanoparticle has a hexagonal crystal structure.

9. An infrared shielding nanoparticles dispersion, comprising the infrared shielding nanoparticles according to claim 1 dispersed in a liquid medium or a solid medium.

10. The infrared shielding nanoparticles dispersion according to claim 9, wherein the solid medium is a resin or a glass.

11. The infrared shielding nanoparticles dispersion according to claim 9, wherein the infrared shielding nanoparticles dispersion is formed into a film shape or a board shape.

12. The infrared shielding nanoparticles dispersion, which is the infrared shielding nanoparticles dispersion of claim 11, wherein when the dispersion is soaked in warm water of 65° C. for 7 days with a visible light transmittance set to 70%, a change of the visible light transmittance before/after the soaking is 5 points or less.

13. The infrared shielding nanoparticles dispersion according to claim 9, wherein the infrared shielding nanoparticles dispersion is formed into a powder shape.

14. The infrared shielding nanoparticles dispersion, which is a kneaded molding of the powder-shaped infrared shielding nanoparticles dispersion of claim 13 and a resin pellet.

15. The infrared shielding nanoparticles dispersion according to claim 9, wherein the liquid medium is one or more media selected from an organic solvent, an organic solvent with resin dissolved therein, an organic solvent with resin dispersed therein, and water.

16. The infrared shielding base material, wherein a surface of a base material is coated with the infrared shielding nanoparticles dispersion of claim 9 to thereby form a coating film thereon.

17. The infrared shielding base material according to claim 16, wherein when the infrared shielding base material is soaked in warm water of 65° C. for 7 days with a visible light transmittance set to 70%, a change of the visible light transmittance before/after the soaking is 5 points or less.

18. The infrared shielding nanoparticles according to claim 1, wherein the first coating film comprises metal oxide, and the second coating film comprises silica and the metal oxide, after being dried into a solid state.

19. A manufacturing method of infrared shielding nanoparticles, comprising the steps of:
    obtaining a dispersion liquid by dispersing in an organic solvent, tungsten oxide nanoparticles expressed by a general formula $W_yO_z$, wherein W is tungsten, O is oxygen, satisfying $2.2 \leq z/y \leq 2.999$, and/or composite tungsten oxide nanoparticles expressed by a general formula $M_xW_yO_z$, wherein M is H, He, alkali metal, alkali earth metal, rare earth elements, one kind or more elements selected from a group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 \leq x/y \leq 1$ and $2.2 \leq z/y \leq 3$;

adding and mixing an organic metal compound into the dispersion liquid;

adding and mixing into the dispersion liquid, a tetrafunctional silane compound expressed by a general formula $Si(OR)_4$, wherein R is identical or different univalent hydrocarbon group having 1 to 6 carbon atoms or its partial hydrolysis product, and/or adding and mixing an organic metal compound, to thereby coat a surface of the individual tungsten oxide nanoparticle and/or composite tungsten oxide nanoparticle with a first coating film comprising the organic metal compound and the second coating film comprising the tetrafunctional silane compound or its partial hydrolysis product, and/or the organic metal compound;

evaporating and removing the organic solvent and further applying heat treatment thereto, to thereby obtain a powder body of the tungsten oxide nanoparticles and/or the composite tungsten oxide nanoparticles coated with the tetrafunctional silane compound or its partial hydrolysis product and/or the organic metal compound; and pulverizing the powder body to thereby obtain the tungsten oxide nanoparticles and/or the composite tungsten oxide nanoparticles coated with the mono- dispersed tetrafunctional silane compound or its partial hydrolysis product and/or the organic metal compound; wherein a combined thickness of the first and second coating films coating the surface of the nanoparticle is 5 nm or more and 30 nm or less; and wherein an addition amount of the organic metal compound is 0.05 parts by weight to 300 parts by weight expressed in terms of a metal element, based on 100 parts by weight of the tungsten oxide nanoparticles and/or the composite tungsten oxide nanoparticles.

20. The manufacturing method of the infrared shielding nanoparticles according to claim 19, wherein in the step of adding and mixing the tetrafunctional silane compound or its partial hydrolysis product, and/or the organic metal compound, and coating the surface of the tungsten oxide nanoparticle and/or the composite tungsten oxide nanoparticle with the tetrafunctional silane compound or its partial hydrolysis product and/or the organic metal compound, first the organic metal compound is added and mixed into the dispersion liquid to thereby obtain a dispersed product containing the organic metal compound, and next, water is added and mixed into the dispersed product containing the organic metal compound, and further the tetrafunctional silane compound or its partial hydrolysis product is added and mixed to thereby obtain a dispersion liquid containing the organic metal compound, the tetrafunctional silane compound or its partial hydrolysis product.

* * * * *